No. 639,457. Patented Dec. 19, 1899.
H. I. STANLEY.
HORSESHOE CALK SHARPENER.
(Application filed June 3, 1899.)
(No Model.)
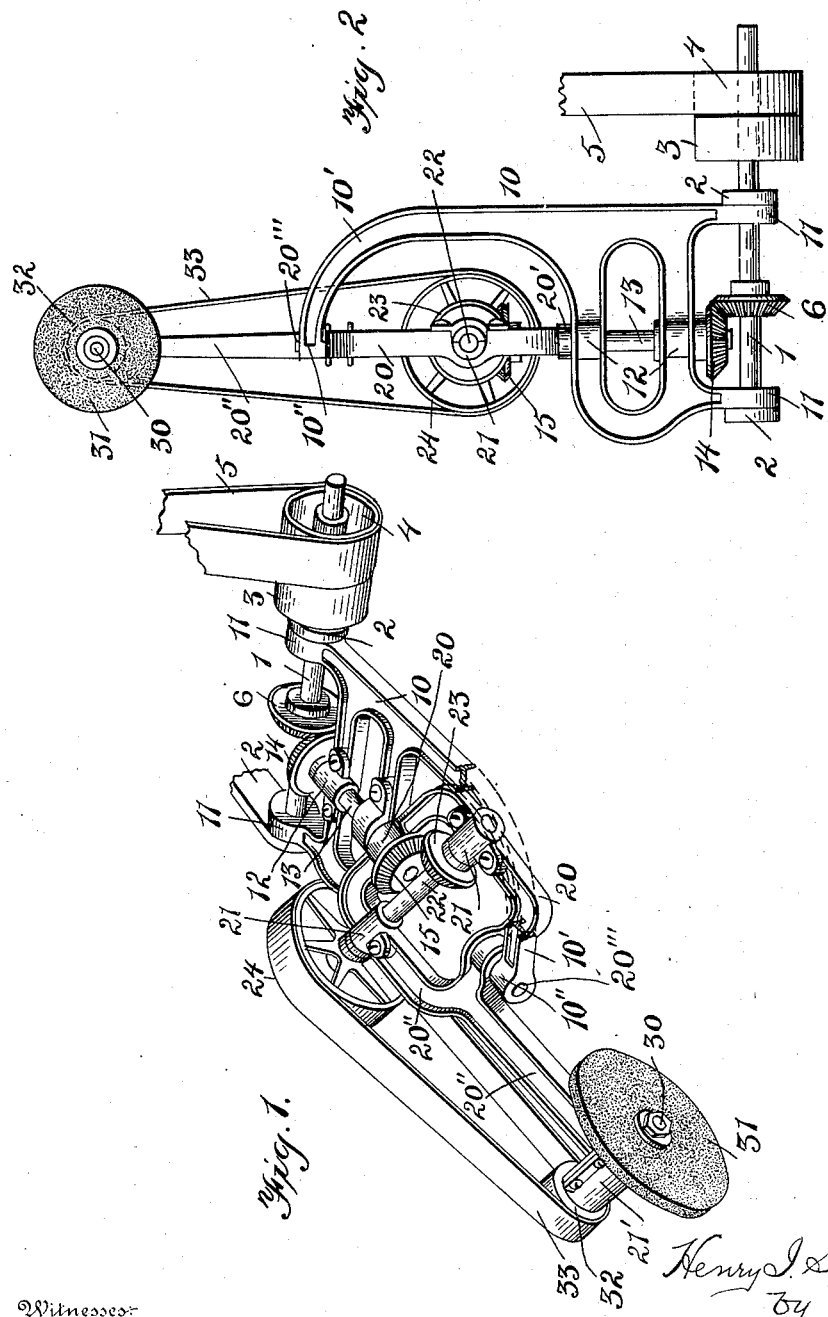
Witnesses:
Geo. E. French
Thos. R. Heath
Henry I. Stanley, Inventor,
by
Collamer & Co.,
Attorneys

UNITED STATES PATENT OFFICE.

HENRY I. STANLEY, OF BERKSHIRE, VERMONT.

HORSESHOE-CALK SHARPENER.

SPECIFICATION forming part of Letters Patent No. 639,457, dated December 19, 1899.

Application filed June 3, 1899. Serial No. 719,195. (No model.)

*To all whom it may concern:*

Be it known that I, HENRY I. STANLEY, a citizen of the United States, and a resident of Berkshire, Franklin county, State of Vermont, have invented certain new and useful Improvements in Horseshoe-Calk Sharpeners; and my preferred manner of carrying out the invention is set forth in the following full, clear, and exact description, terminating with claims particularly specifying the novelty.

This invention relates to grinding and polishing, and more especially to machines adapted to operate in this manner on points; and the object of the same is to produce such a machine adapted especially for sharpening horseshoe-calks.

To this end the invention consists in the construction of parts, as hereinafter more fully described and claimed and as illustrated in the drawings hereto attached, wherein—

Figure 1 is a general perspective view of this machine in use, certain parts being broken away. Fig. 2 is a bottom plan view of the same when turned up against the wall out of the way.

Referring to the said drawings the numeral 1 designates the main or driving shaft, journaled in bearings 2, preferably supported from an upright wall or the like, and 3 and 4 are fast and loose pulleys on this shaft, to which is run a belt 5 from any suitable source of power, there possibly being a belt-shifter. (Not shown.) Fast on the shaft 1, between its bearings, is the bevel-gear 6.

10 is a frame (as of casting) having ears 11 11, standing next adjacent the bearings 2 2 and surrounding the shaft 1, on which it is thereby pivoted, and in bearings 12 on this frame is journaled a second or driven shaft 13, having at one end a bevel-gear 14 in constant mesh with that on the main shaft and at its other end a second bevel-gear 15.

10' is an arm or extension from one side of the frame, and 10'' is an eye or bearing at its outer end in axial alinement with the driven shaft.

20 is a yoke of curved shape having an eye 20' at one end journaled on the driven shaft 13, behind its gear 15, and a pin or bearing 20''' at its other end journaled in the eye 10'', and beyond the latter the yoke carries an arm 20'', having bearings 21 and 21' at its opposite ends. In the former of these and in a similar bearing at about the center of the curved body of the yoke is journaled a cross-shaft 22, carrying a bevel-gear 23, meshing with that numbered 15 on the driven shaft, while the other end of this cross-shaft may have a pulley 24.

30 is the grinder-shaft, journaled in and extending through the outer bearing 21' of this arm, while 31 is the grinding tool or wheel at one end thereof, and 32 is or may be a pulley at its other end, (here shown as belted at 33 to the pulley 24.) I say that I may use these two pulleys and their connecting-belt, because it is obvious that other means might be employed for communicating power from the cross-shaft to the grinder-shaft, and I desire to include such means.

Obviously the grinder may be of any desired pattern and material, and clearly also the exact size, shape, and materials of all parts is not essential, though preferably of metal and made in about the proportion shown.

When out of use, the machine may be lifted up and hooked against the wall, as shown in Fig. 2. When it is desired to use the grinder, as for sharpening horseshoe-calks or other like articles, the machine is unhooked and let down, the ears 11 11 turning around the driving-shaft 1 as pivots. Power is then applied to rotate such shaft, and its motion is communicated through the intermeshing gears 6 14 to the driven shaft 13, thence through the intermeshing gears 15 23 to the cross-shaft 22, and finally through the two pulleys and belt to the grinder-shaft 30. The latter carries the grinder 31, which by the construction shown is driven at a high rate of speed and can be stopped and started by shifting the belt 5 or otherwise interrupting the source of power; but in the use of a grinder for sharpening horseshoe-calks without removing the shoe from the animal's hoof it becomes necessary to turn the grinder and to raise and lower it to suit all angles and occasions. It will be clear that the entire frame can be raised and lowered around the main shaft, as above set forth, and this provides for the vertical adjustment of the grinder. Furthermore, the yoke can be turned on its pivots formed by the eye 20' and the pin 20''' in the eye 10″, so that it has an axial rocking motion within the frame. It will be noticed that the grinder 31 is on that end of the grinder-shaft which brings it directly forward of the pin 20‴, and hence this axial movement or turning of the yoke and its arm causes the grinding-wheel to be turned as the operator may desire. The yoke and its arm are so proportioned as to cause them to stand normally balanced on their longitudinal pivots for the purpose of giving the operator greater freedom of movement.

What is claimed as new is—

1. In a machine of the character described, the combination with a horizontal driving-shaft mounted in bearings, a frame having ears journaled on said shaft next its bearings, a driven shaft journaled in said frame at right angles to the driving-shaft, and gearing between these shafts; of a cross-shaft supported at right angles to the driven shaft, gearing between this cross-shaft and the driven shaft, means for swinging the cross-shaft bodily, the tool, and connections between it and the cross-shaft, as and for the purpose set forth.

2. In a machine of the character described, the combination with a frame mounted on horizontal pivots, a driving-shaft, a driven shaft journaled in the frame, and connections between these shafts; of a yoke pivoted in the frame in axial alinement with the driven shaft, a cross-shaft carried by said yoke, connections between this shaft and the driven shaft, an arm on the yoke projecting beyond the outer end of the frame, a tool carried by such arm, and connections between the tool and cross-shaft, as and for the purpose set forth.

3. In a machine of the character described, the combination with a frame mounted on horizontal pivots, a driven shaft journaled longitudinally in said frame and driven from a suitable source, a yoke comprising a curved body standing within the frame and pivoted thereto in axial alinement with said shaft, and an arm on the yoke projecting beyond the outer end of the frame; of a tool supported by the outer end of such arm, a cross-shaft journaled in the yoke between the center of its curved body and the inner end of said arm, pulleys on this shaft and on the tool-shaft, and a belt connecting them, as and for the purpose set forth.

4. In a grinding-machine, the combination with a frame having an open body and an extension from one side of the same with an eye at its outer end, a shaft journaled longitudinally in said body in alinement with the eye, and means for rotating said shaft; of a yoke having a curved body with an eye at one end journaled on said shaft and a pin at the other entering said eye, such body standing within the body of the frame and extension, an arm carried by the outer end of the yoke opposite its pin, bearings on the yoke-body and at the inner end of said arm, a cross-shaft journaled therein, gears connecting this shaft with the driven shaft, a grinding-tool at the outer end of the arm, and connections between the tool and cross-shaft, as and for the purpose set forth.

5. In a grinding-machine, the combination with a frame having a longitudinal driven shaft and an eye at its outer end in alinement therewith, a yoke journaled on said shaft and in such eye, an arm carried by the yoke, and a transverse bearing at the outer end of the arm; of a cross-shaft journaled in the yoke and geared to the driven shaft, a pulley on the cross-shaft, a grinder-shaft journaled in the bearing of the arm, a grinding-tool on that end thereof which stands in alinement with the driven shaft, a pulley on the other end, and a belt connecting the pulleys, as and for the purpose set forth.

In testimony whereof I have hereunto subscribed my signature this the 28th day of April, A. D. 1899.

HENRY I. STANLEY.

Witnesses:
 JOE BOCASH,
 H. E. RUNTEDT.